United States Patent
Kassai et al.

(10) Patent No.: US 7,585,026 B2
(45) Date of Patent: Sep. 8, 2009

(54) SEAT OF CHILD-CARE INSTRUMENT

(75) Inventors: Kenzou Kassai, Osaka (JP); Ichiro Ohnishi, Nara (JP)

(73) Assignee: Aprica Children's Products Inc., Osaka-shi (JP)

( * ) Notice: Subject to any disclaimer, the term of this patent is extended or adjusted under 35 U.S.C. 154(b) by 266 days.

(21) Appl. No.: 10/546,469

(22) PCT Filed: Apr. 12, 2004

(86) PCT No.: PCT/JP2004/005221

§ 371 (c)(1),
(2), (4) Date: Oct. 18, 2005

(87) PCT Pub. No.: WO2004/093608

PCT Pub. Date: Nov. 4, 2004

(65) Prior Publication Data

US 2006/0097563 A1 May 11, 2006

(30) Foreign Application Priority Data

Apr. 18, 2003 (JP) .............................. 2003-113519

(51) Int. Cl.
*B60N 2/26* (2006.01)
*B60R 21/00* (2006.01)

(52) U.S. Cl. .............................. 297/250.1; 297/256.16; 297/486

(58) Field of Classification Search .............. 297/250.1, 297/256.16, 486, 487, 488

See application file for complete search history.

(56) References Cited

U.S. PATENT DOCUMENTS

| | | | | |
|---|---|---|---|---|
| 3,799,577 A | * | 3/1974 | Colucci | 297/478 |
| 4,192,530 A | * | 3/1980 | Cachia | 280/802 |
| 4,288,097 A | * | 9/1981 | Ueda | 280/802 |
| 4,431,233 A | * | 2/1984 | Ernst | 297/468 |
| 4,738,489 A | * | 4/1988 | Wise et al. | 297/487 |
| 4,919,488 A | * | 4/1990 | Deegener et al. | 297/468 |
| 5,061,012 A | * | 10/1991 | Parker et al. | 297/467 |
| 5,286,086 A | * | 2/1994 | Gunji | 297/250.1 |
| 5,429,419 A | | 7/1995 | Kassai et al. | |
| 5,709,408 A | * | 1/1998 | Carraway, Jr. | 280/804 |
| 6,481,794 B1 | * | 11/2002 | Kassai et al. | 297/250.1 |

(Continued)

FOREIGN PATENT DOCUMENTS

JP 55-120355 8/1980

(Continued)

OTHER PUBLICATIONS

Opposition against counterpart EP Patent 1,616,509.

*Primary Examiner*—Sarah B McPartlin
(74) *Attorney, Agent, or Firm*—W. F. Fasse; W. G. Fasse

(57) ABSTRACT

A crotch belt (20) which is one component of a body restraint belt includes an elastic plate (21) having bending elasticity, and a buckle (22) mounted on an end of the elastic plate (21). One end of the elastic plate (21) is fixed to a fixing point (23) under a seating surface (4). While the crotch belt (20) is not connected to a waist belt, the crotch belt (20) is positioned along a front part of the seating surface (4) so as to be close to it by elastic force of the elastic plate (21).

17 Claims, 8 Drawing Sheets

U.S. PATENT DOCUMENTS

| | | | |
|---|---|---|---|
| 6,543,847 B2 * | 4/2003 | Balensiefer | 297/250.1 |
| 2005/0179289 A1 * | 8/2005 | Fuller et al. | 297/250.1 |

FOREIGN PATENT DOCUMENTS

| | | |
|---|---|---|
| JP | 11-189128 | 7/1999 |
| JP | 2000-219138 | 8/2000 |
| JP | 2000-296734 | 10/2000 |
| JP | 2000-301972 | 10/2000 |
| JP | 2001-328471 | 11/2001 |
| JP | 2002-337696 | 11/2002 |

* cited by examiner

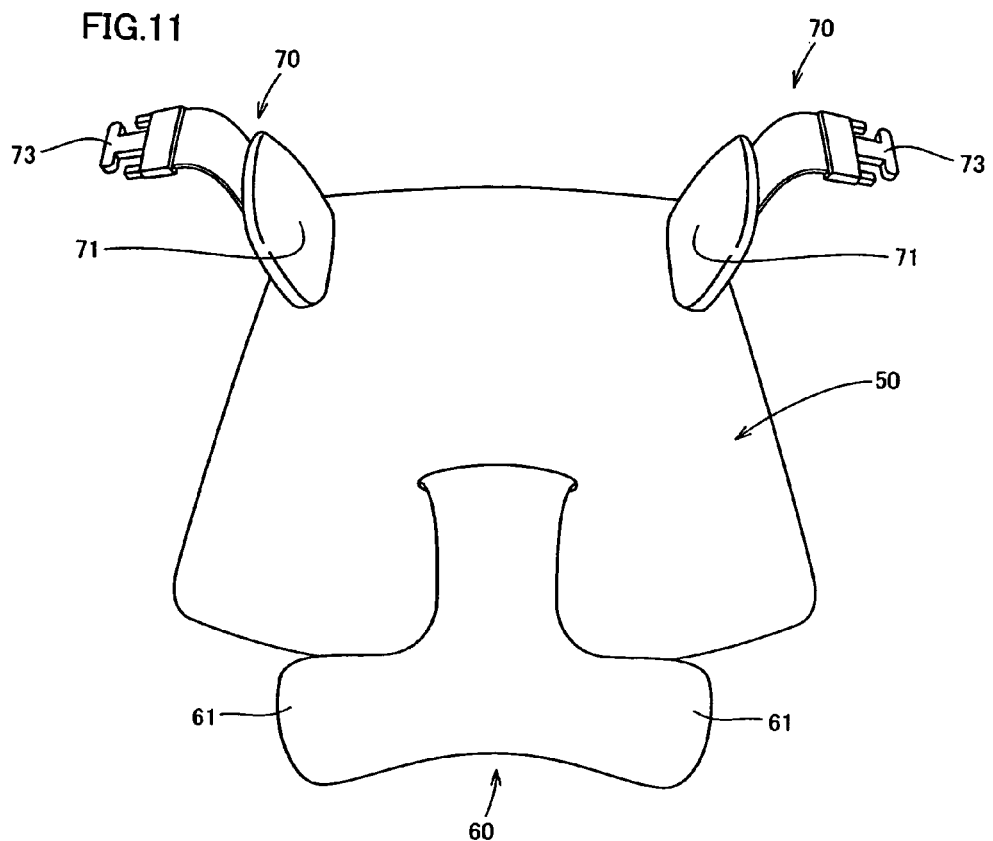
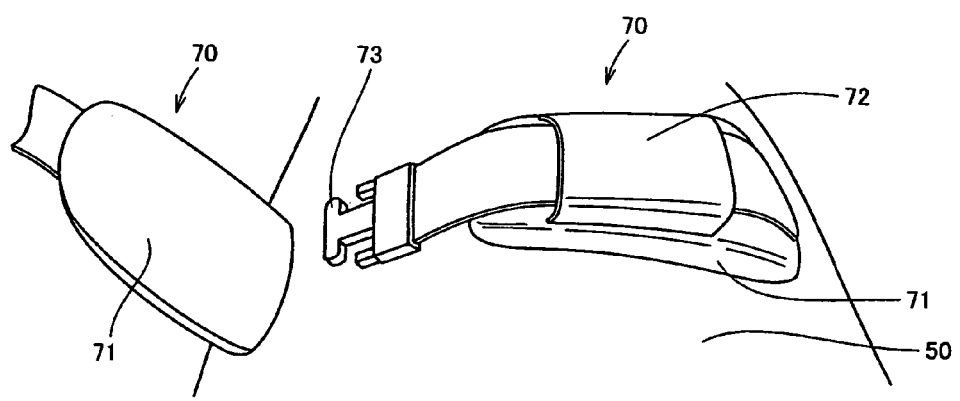

SEAT OF CHILD-CARE INSTRUMENT

TECHNICAL FIELD

The present invention relates to a child-care instrument comprising a seat such as a baby carriage or a child safety seat and more particularly, it relates to a seat of a child-care instrument comprising a body restraint belt which restrains a child body.

BACKGROUND ART

As an example of the child-care instrument, a description will be made of a baby carriage.

A body restraint belt of the baby carriage includes a crotch belt, and a pair of waist belts connected to the crotch belt through a buckle in general. In a state where the child is not seated in the baby carriage, the crotch belt and the pair of waist belts are randomly positioned on a seating surface of the baby carriage in a slacked state.

Therefore, when the child is to be seated in the baby carriage, it is necessary to move the crotch belt and the waist belt out of the way and then put the child on the seat. This work to move the crotch belt and the waist belt is a little troublesome.

In addition, while the crotch belt and the waist belt are randomly positioned on the seating surface in the slacked state, when the baby carriage is to be folded, the folding operation could be hindered because the crotch belt and/or the waist belt are unnaturally sandwiched between the seating surface and a backrest part.

Although there is a crotch belt which becomes a self-standing state when it is not used in a conventional baby carriage, the self-standing crotch belt becomes an obstacle when the child is to be seated.

Meanwhile, it is desirable that the body restraint belt or the buckle does not press against an abdominal part of the child while the child body is restrained by the body restraint belt.

DISCLOSURE OF THE INVENTION

It is an object of the present invention to eliminate a troublesome work such as to move a body restraint belt out of the way when a child is to be seated on a seat of a child-care instrument.

It is another object of the present invention to provide a body restraint belt which does not press against an abdomen part of the child.

The present invention is based on a seat of a child-care instrument comprising a body restraint belt which restrains a body of a seated child, and fixing means for fixing and holding the body restraint belt in a predetermined restraint position, and characterized as follows.

That is, the body restraint belt is constituted so as to be automatically brought to an open position to open a front surface of the seat while it is not locked by the fixing means.

According to the above constitution, since the body restraint belt is positioned so that the front surface of the seat is always opened when it is not used, it is not necessary to move the body restraint belt out of the way when the child is to be seated.

Preferably, the body restraint belt includes a member having elastic force and it is constituted so as to be automatically returned to the open position by the elastic force. According to one embodiment, the body restraint belt itself is formed of an elastic member. According to another embodiment, the body restraint belt includes a cushion material arranged so as to be along the belt part, and it is constituted so as to be automatically returned to the open position by elastic force of the cushion material.

According to still another embodiment, the seat of the child-care instrument includes a tensile member which connects an external surface of the body restraint belt facing the outside, to a surface of the seat opposed to the external surface in a tensed state, whereby the body restraint belt is automatically returned to the open position by tensile force of the tensile member.

The body restraint belt preferably has a curved configuration which expands outward while it is fixed and held by the fixing means in the restraint position. Thus, the abdomen part of the child is not pressed because of this curved configuration.

For example, the body restraint belt includes a crotch belt to be pulled out from between both thighs of the seated child. The crotch belt is positioned along a seating surface positioned in front of a part in which the crotch belt is pulled out while it is not locked by the fixing means.

Furthermore, the body restraint belt includes a pair of waist belts which restrains a waist part of the seated child. In this case, each waist belt is positioned along a side surface of the seat while it is not locked by the fixing means.

According to one embodiment, the crotch belt includes a pair of side extension parts extending from its upper end to both sides. In this case, the upper end and the pair of side extension parts of the crotch belt have a configuration so as to wrap around the waist part of the seated child with a smooth surface. Preferably, each side extension part is positioned in a gap between the waist part of the seated child and the seat.

According to a concrete embodiment, the body restraint belt includes a crotch belt which is to be pulled out from between both thighs of the seated child, and a pair of waist belts which restrains a waist part of the child. The crotch belt is positioned along a seating surface positioned in front of a part in which the crotch belt is pulled out while it is not locked by the fixing means. Each waist belt is positioned along a side surface of the seat while it is not locked by the fixing means. The crotch belt includes a pair of side extension parts extending from its upper end to both sides, and each waist belt extends on the side extension part of the crotch belt. In order to connect the crotch belt and the pair of waist belts, a receiver tool for connection is mounted on an external surface of the upper end of the crotch belt, and an insertion tool which engages with the receiver tool is mounted on an end of each waist belt, for example.

BRIEF DESCRIPTION OF THE DRAWINGS

FIG. 11 is a perspective view showing another example of the crotch belt in the open position;

FIG. 12 is a perspective view showing a waist belt;

BEST MODE FOR CARRYING OUT THE INVENTION

Figure 1:
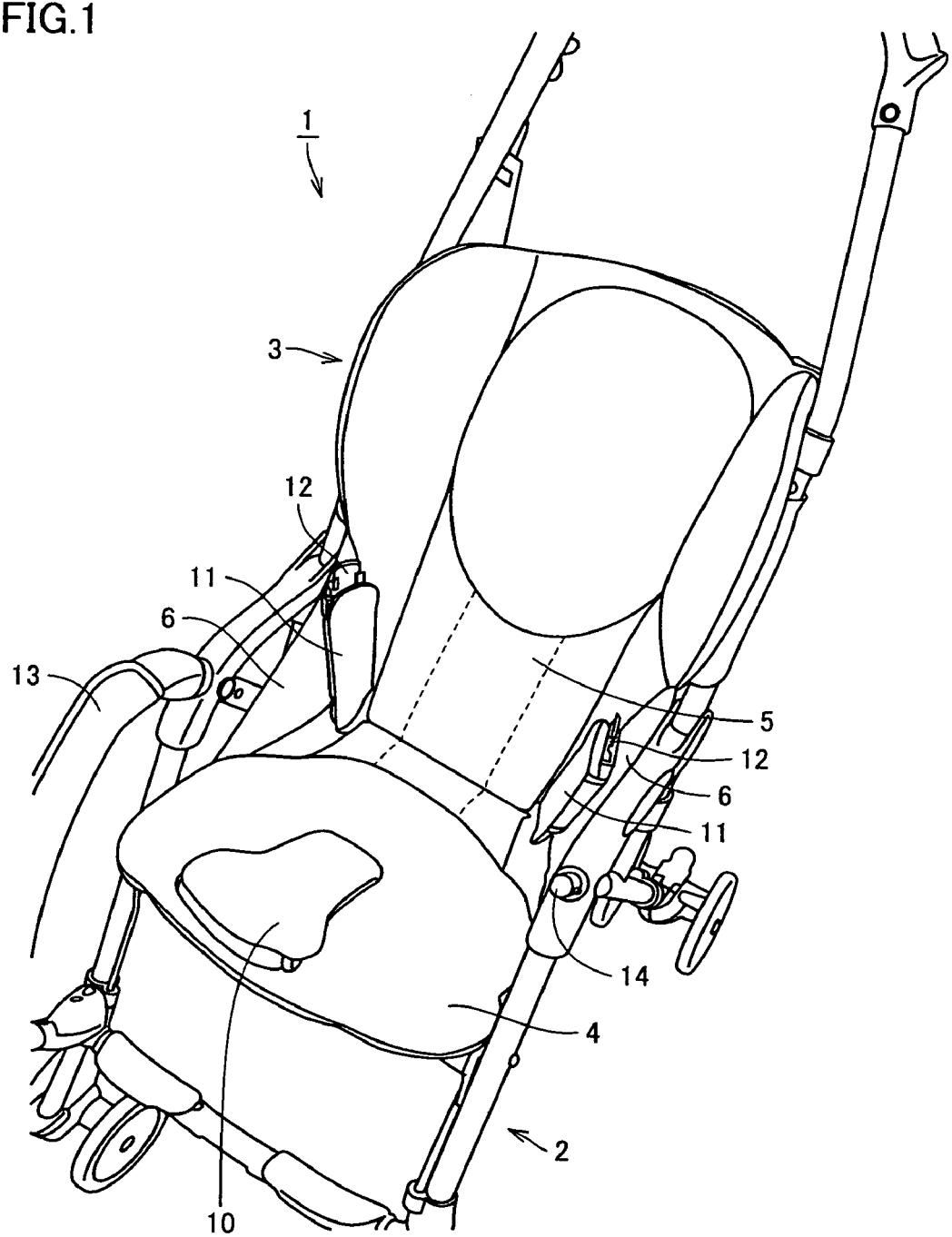
FIG. 1 is a perspective view showing a seat of a baby carriage in a state in which a body restraint belt is in an open position.

FIG. 1 shows a baby carriage as an example of a child-care instrument. As shown in FIG. 1, a baby carriage 1 comprises a body 2, and a seat 3 provided on the body 2. According to an illustrated embodiment, the seat 3 is formed by a seat hammock.

The seat 3 comprises a seating surface 4, a backrest surface 5 and a pair of side surfaces 6. The baby carriage 1 comprises a body restraint belt to restrain a child body seated in the baby carriage 1 and fixing means for fixing and holding the body restraint belt in a predetermined restraint position.

According to the illustrated embodiment, the body restraint belt includes a crotch belt 10 to be pulled out from between both thighs of the seated child, and a pair of waist belts 11 to restrain the waist of the seated child. The crotch belt and the pair of waist belts are connected through fixing means such as a buckle. Although it cannot be clearly recognized from the drawing, the crotch belt 10 includes a belt which is to be pulled out from beneath of the seating surface, a receiver tool which is one component of the buckle mounted on an end of this belt, and a crotch pad arranged along the belt and the receiver tool. An insertion tool 12 which is one component of the buckle is mounted on an end of the pair of waist belts 11. When the insertion tool engages with the receiver tool, the crotch belt 10 is connected to the pair of waist belts 11.

As shown in FIG. 1, the crotch belt 10 and the pair of waist belts 11 which are the components of the body restraint belt are constituted so as to be automatically brought to an open position to open a front surface of the seat 3 while they are not locked by the fixing means such as the buckle.

More specifically, the crotch belt 10 is positioned along the seating surface 4 positioned in front of a part in which the crotch belt is pulled out so as to be close to it. In addition, each waist belt 11 is positioned along a side surface 6 of the seat 3 so as to be close to it. Therefore, when the child is to be seated, the troublesome work such as to move the crotch belt 10 and the waist belt 11 out of the way is not necessary.

Figure 2:
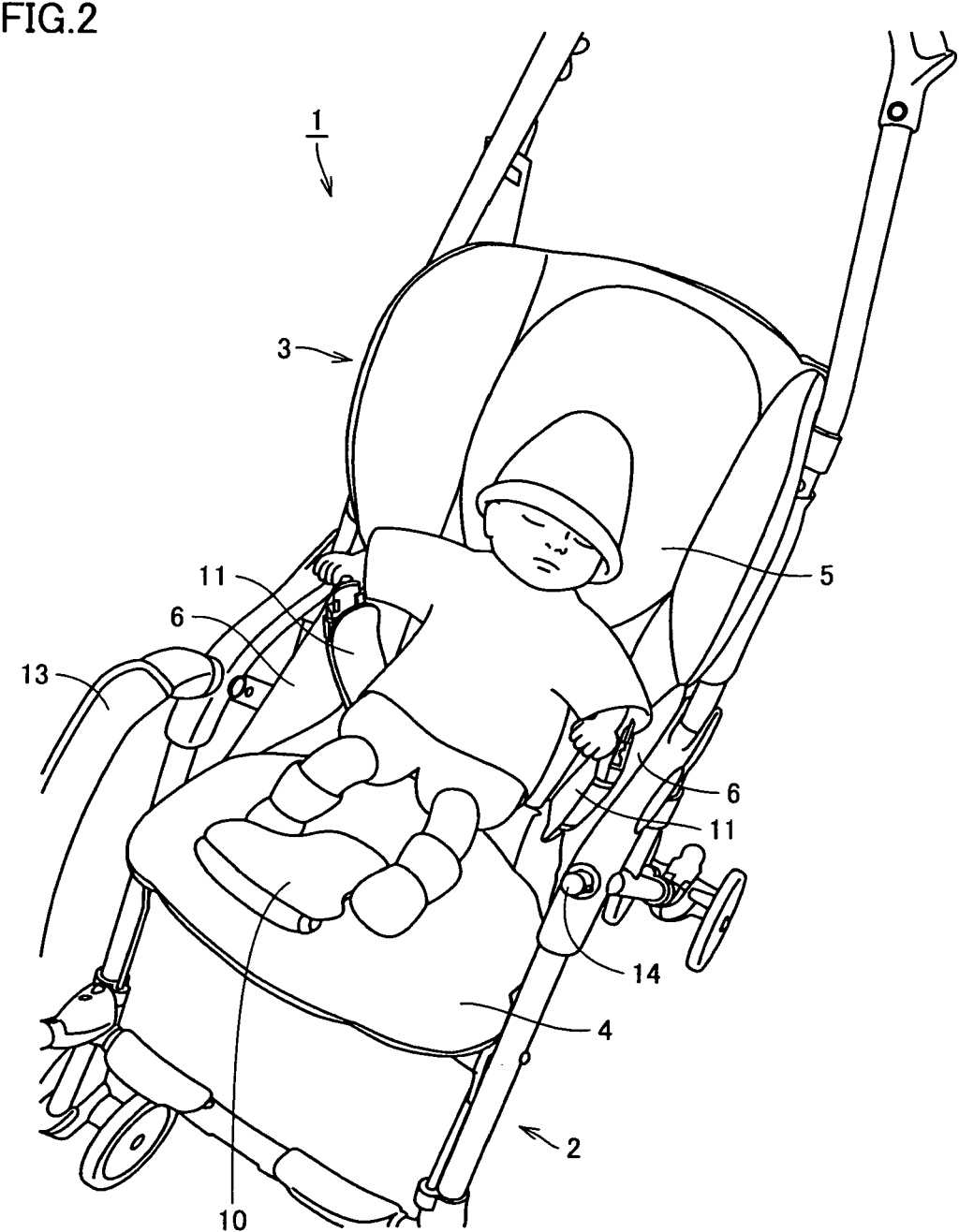
FIG. 2 is a perspective view showing a state in which a child is put on the seat shown in FIG. 1.
Figure 3:
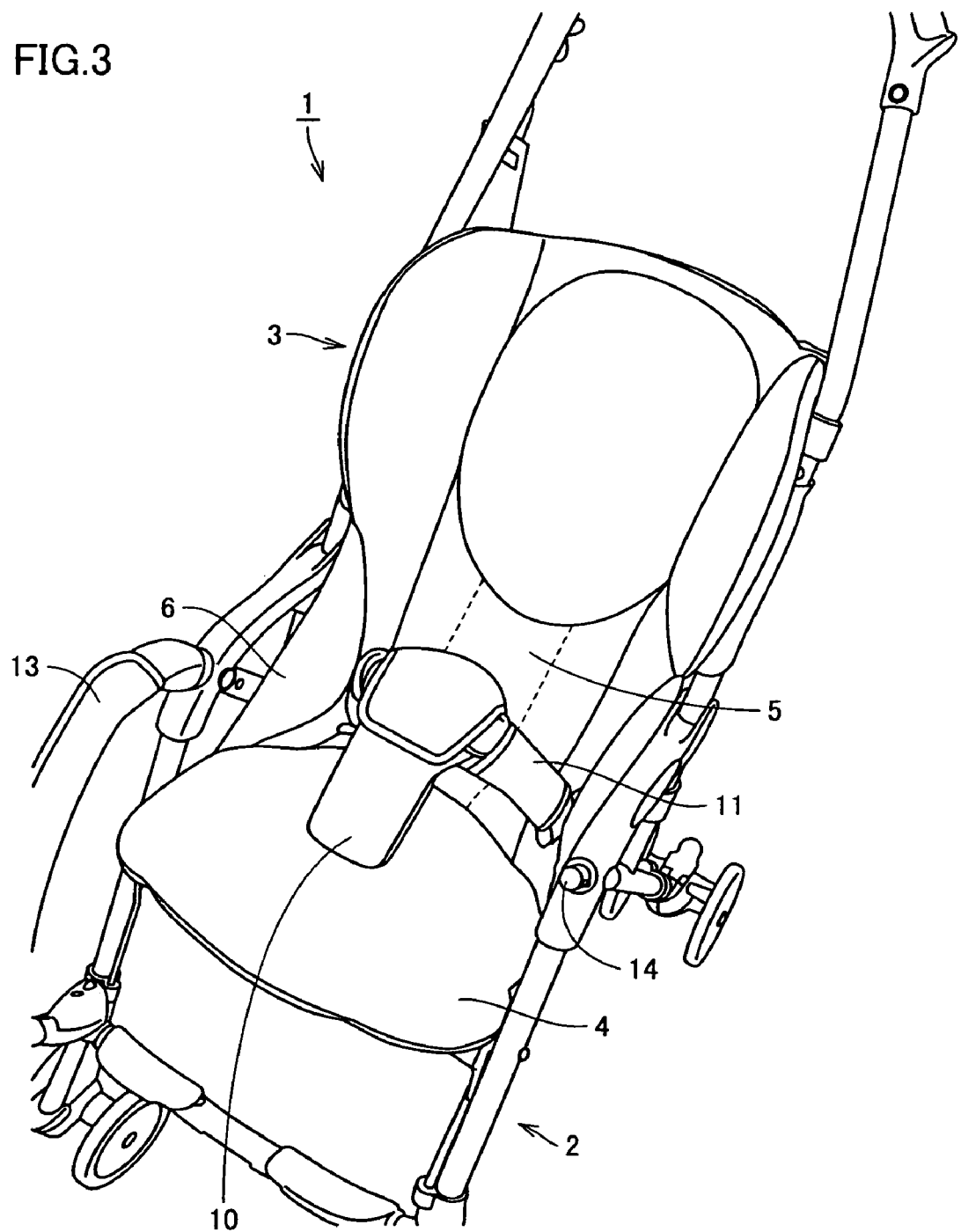
FIG. 3 is a perspective view showing a state in which the body restraint belt is fixed and held in a restraint position.

FIG. 2 shows a state in which the child is put on the seat, and FIG. 3 shows a state in which the crotch belt 10 and the pair of waist belts are connected. A front guard 13 is provided in front of the seat 3 of the baby carriage in general. FIGS. 1 to 3 show a state in which one end of the front guard 13 is removed from a connecting point 14. While the child is on the seat 3 of the baby carriage 1, the one end of the front guard is connected to the connecting point 14.

Preferably, in order not to press against the abdomen part of the child on the seat 3, the body restraint belts 10 and 11 are constituted so as to have a curved configuration which expands outward while they are retained by the fixing means such as the buckle in the restraint position.

Figure 4:
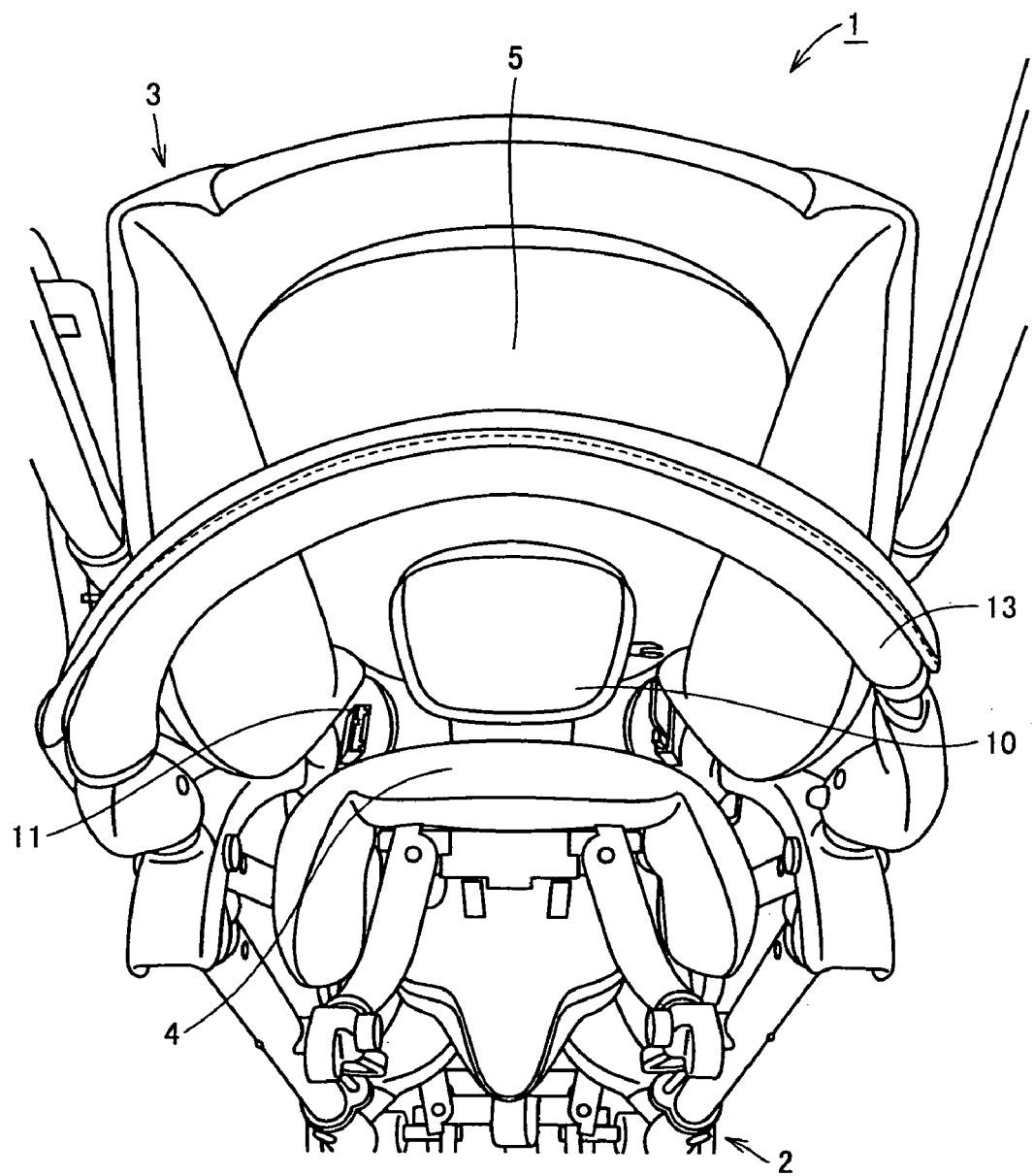
FIG. 4 is a perspective view showing a folded state of the baby carriage taken from above.

FIG. 4 is a view showing a folded state of the baby carriage taken from above. While the child is not seated, since the crotch belt 10 and the pair of waist belts are positioned along the seating surface 4 and the side surface 6 of the seat 3 so as to be close to them, respectively, when the baby carriage 1 is folded, the crotch belt 10 and the pair of waist belts 11 are not unnaturally sandwiched between the seating surface 4 and the backrest surface 5, so that they do not hinder the folding operation.

Figure 5:
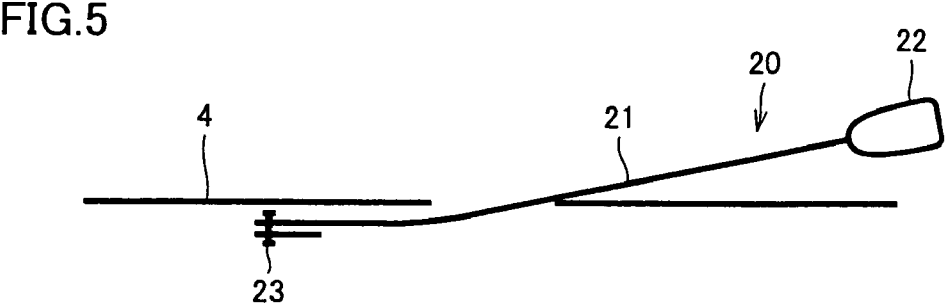
FIG. 5 is an illustrated view showing one example of a crotch belt in the open position.
Figure 6:
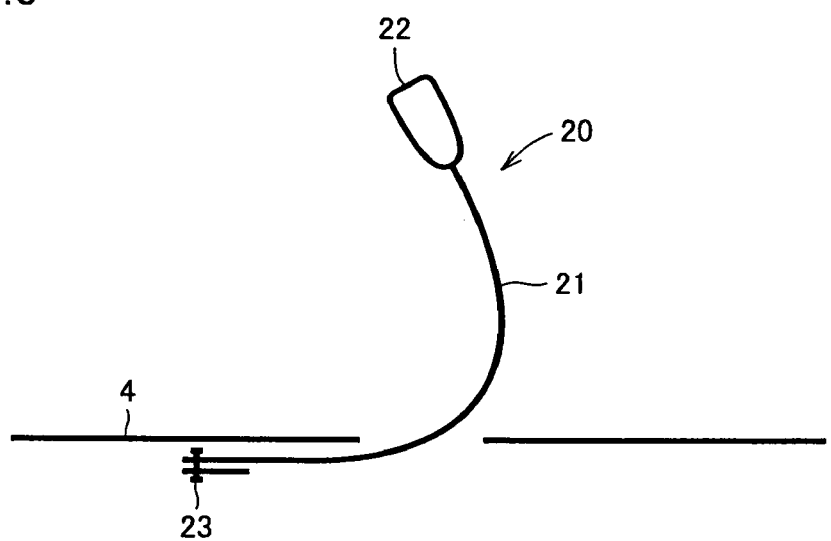
FIG. 6 is an illustrated view showing a state in which the crotch belt shown in FIG. 5 is in the restraint position.

FIGS. 5 and 6 show an example of a crotch belt 20 which is one component of the body restraint belt. According to this embodiment, the crotch belt 20 includes an elastic plate 21 having bending elasticity, and a buckle 22 mounted on an end of the elastic plate 21. For example, the elastic plate 21 may be constituted by a leaf spring. One end of the elastic plate 21 is fixed to a fixing point 23 under a seating surface 4.

As shown in FIG. 5, when the crotch belt 20 is not connected to a waist belt, the crotch belt 20 is positioned along a front part of the seating surface 4 so as to be close to it by elastic force of the elastic plate 21.

FIG. 6 shows a state in which the crotch belt 20 is connected to the waist belt (not shown). In this state, since the elastic plate 21 has a curved configuration which expands outward by its bending elasticity, it does not press against the abdomen part of the child.

Figure 7:
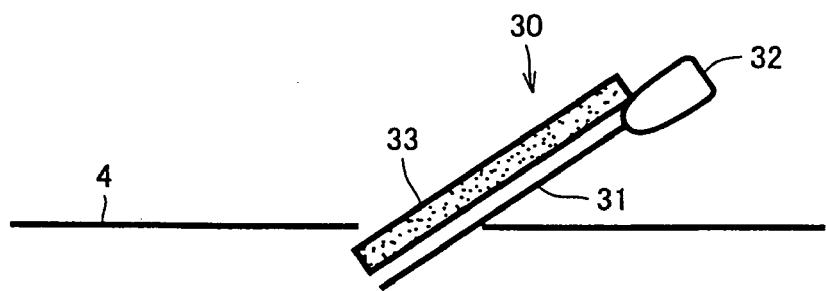
FIG. 7 is an illustrated view showing another example of the crotch belt in the open position.
Figure 8:
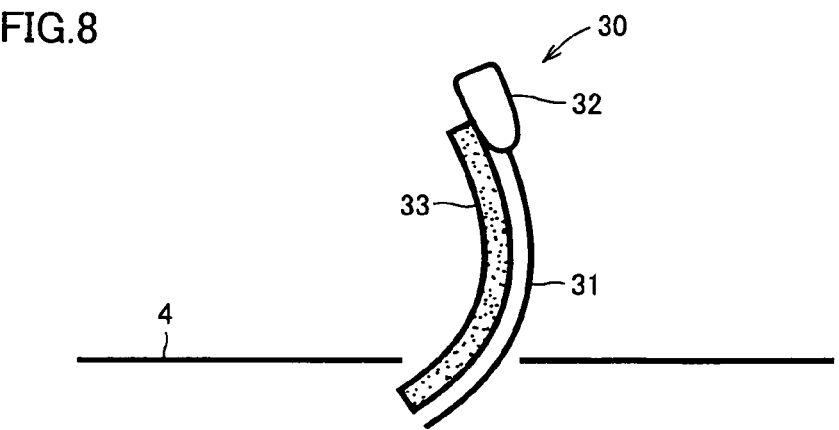
FIG. 8 is an illustrated view showing a state in which the crotch belt shown in FIG. 7 is in the restraint position.

FIGS. 7 and 8 show another example of the crotch belt. An illustrated crotch belt 30 includes a flexible belt 31 whose one end is fixed under a seating surface 4, a buckle 32 mounted on an end of the belt 31, and a cushion material 33 arranged so as to be along an inwardly facing surface of the flexible belt 31. The cushion member 33 and the flexible belt 31 are integrated through a cover member, for example. In addition, as shown in FIGS. 7 and 8, a base end of the cushion material 33 is fixed to the seating surface 4 or under the seating surface 4. Each waist belt (not shown in FIGS. 7 and 8) may have the same construction as the crotch belt, with a cushion material on an inwardly facing surface of a flexible belt, and optionally covered by a cover member.

As shown in FIG. 7, while the crotch belt 30 is not connected to a waist belt, the crotch belt 30 is positioned along a front part of the seating surface 4 so as to be close to it by elastic force of the cushion material 33.

FIG. 8 shows a state the crotch belt 30 is connected to the waist belt (not shown). In this state, since the crotch belt 30 has a curved configuration which expands outward by bending elastic force of the cushion material 33, it does not press against the abdomen part of the child.

Figure 9:
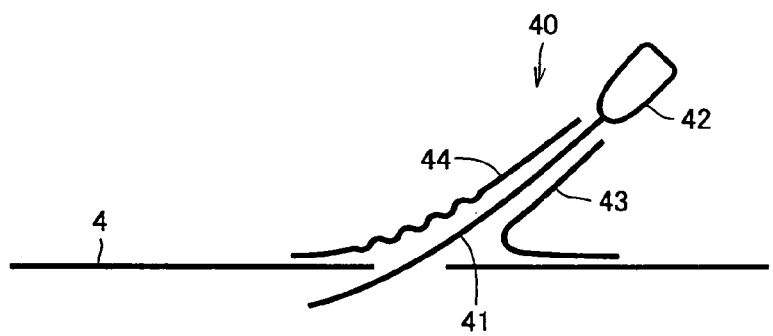
FIG. 9 is an illustrated view showing still another example of the crotch belt in the open position.
Figure 10:
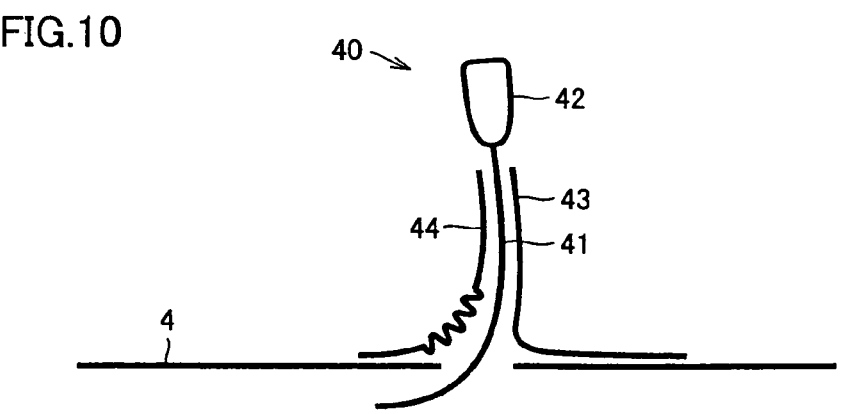
FIG. 10 is an illustrated view showing a state in which the crotch belt shown in FIG. 9 is in the restraint position.

FIGS. 9 and 10 show still another example of the crotch belt. An illustrated crotch belt 40 includes a flexible belt 41 whose one end is fixed under a seating surface 4, a buckle 42 mounted on an end of the belt 41, an external surface sewn member 43 arranged so as to be along an external surface of the flexible belt 41, and an internal surface sewn member 44 arranged so as to be along an internal surface of the flexible belt 41.

The external surface sewn member 43 is sewn so that the external surface of the crotch belt 41 may be connected to the seating surface 4 of the seat opposed to the above external surface in a tensed state. Therefore, as shown in FIG. 9, when the crotch belt 40 is not connected to the waist belt, the crotch belt 40 is positioned along a front part of the seating surface 4 so as to be close to it by tensile force of the external surface sewn member 43.

FIG. 10 shows a state in which the crotch belt 40 is connected to the waist belt (not shown). In this state, since the crotch belt 40 provides a curved configuration which expands outward by tensile force of the external surface sewn member 43, it does not press against the abdomen part of the seated child.

Although FIGS. 5 to 10 illustrate various kinds of crotch belts, the same structure can be applied to the waist belt.

FIGS. 11 to 14 show a body restraint belt according to another embodiment of the present invention. The body restraint belt includes a crotch belt 60 pulled out from a seating surface 50, and a pair of waist belts 70. As shown in FIG. 11, the crotch belt 60 is positioned along the seating surface positioned in front of a part in which the crotch belt is pulled out while it is not locked by fixing means. While each waist belt 70 is not locked by the fixing means, it is positioned along a side surface of a seat.

Figure 13:
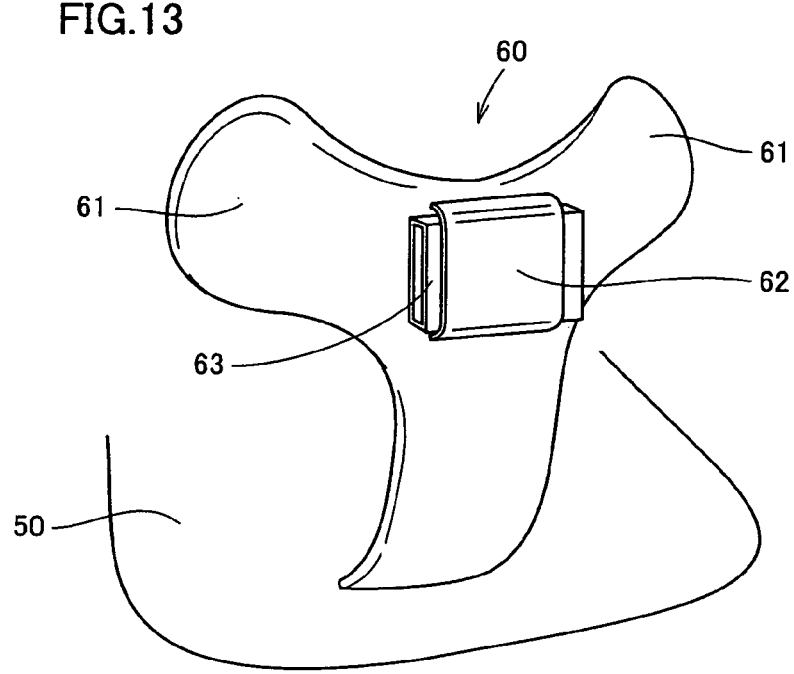
FIG. 13 is a perspective view showing the crotch belt.

As shown in FIGS. 11 and 13, the crotch belt 60 includes a pair of side extension parts 61 which extends from its upper end to both sides. Preferably, the upper end of the crotch belt 60 and the pair of side extension parts have a configuration so that the abdomen part of the seated child is covered with a smooth surface. When such crotch belt 60 is used, the waist part of the child can be stably retained.

As shown in FIG. 12, the waist belt 70 includes a waist belt pad 71 which provides elastic force to be automatically returned to an open position. A loop 72 is formed on an external surface of the waist belt pad 71 and the waist belt passes through the loop 72. In addition, an insertion tool 73 for connection is mounted on an end of the waist belt 70.

As shown in FIG. 13, a loop 62 and a receiver tool 63 for connection covered with the loop 62 are provided on an external surface of an upper end of the crotch belt 60. While the body restraint belt is put on, the insertion tools 73 provided at the ends of the pair of waist belts 70 are detachably inserted into the receiver tool 63.

Figure 14:
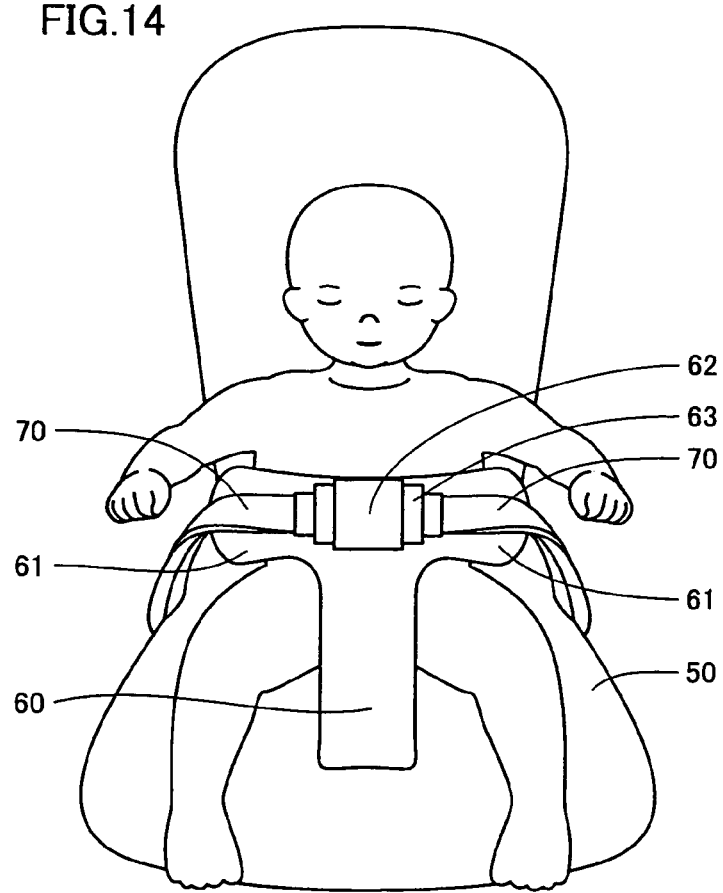
FIG. 14 is a view showing a state in which a child body is restrained by the body restraint belt.

As shown in FIG. 14, each waist belt 70 extends on the side extension part 61 of the crotch belt 60. Since each side extension part 61 is positioned in a gap between the seated child body and the seat, the waist part of the seated child can be stabilized.

Although the description has been made of the baby carriage as the child-care instrument in the illustrated embodiments, the present invention may be equally applied to a child-care instrument comprising a seat provided with a body restraint belt such as the child safety seat. In the case of the child safety seat, the body restraint belt is a five-point belt which normally includes a crotch belt, a shoulder belt, and a waist belt. In general, the shoulder belt and the waist belt continuously extend. The present invention can be applied to the above body restraint belt of the child safety seat.

INDUSTRIAL APPLICABILITY

The present invention can be advantageously applied to a seat of a child-care instrument comprising a body restraint belt which restrains a child body.

What is claimed is:

1. A child-care instrument being configured and adapted to have a child seated therein, wherein said child-care instrument comprises:
    a seat having a seating surface adapted to support the child thereon, and a pair of side surfaces arranged at two sides of said seating surface; and
    a body restraint arrangement adapted to restrain the child in said seat;
    wherein:
        said body restraint arrangement comprises a crotch belt extending upward from said seating surface at a position between said two sides of said seating surface, a pair of waist belts extending upward respectively at said two sides of said seating surface laterally inwardly of said side surfaces, and a fixture arrangement attached to and adapted to selectively interconnect said crotch belt and said waist belts so as to restrain the child in said seat;
        said crotch belt includes a first elastic member arranged and adapted to exert an elastic force that urges said crotch belt forwardly when said fixture arrangement is disconnected to disconnect said crotch belt from said waist belts;
        said waist belts respectively include second elastic members arranged and adapted to exert elastic forces that urge said waist belts respectively laterally outwardly when said fixture arrangement is disconnected to disconnect said waist belts from said crotch belt;
        said crotch belt is positioned to extend upwardly between two thighs of the child, and said waist belts are positioned to restrain a waist of the child;
        said crotch belt and said waist belts are adapted to be held in a closed restraint position for restraining the child when said fixture arrangement is connected so as to interconnect said crotch belt and said waist belts;
        said crotch belt and said waist belts are adapted to be respectively urged to an open position thereof by said elastic forces when said fixture arrangement is disconnected so as to disconnect said crotch belt and said waist belts;
        said crotch belt in said open position thereof extends forwardly above a portion of said seating surface in front of said position at which said crotch belt extends upwardly from said seating surface;
        said waist belts in said open position thereof extend upwardly along and laterally inwardly from said side surfaces of said seat; and
        said crotch belt further includes a first belt member and said first elastic member comprises an elastic cushion material arranged along said first belt member, and optionally also said waist belts respectively further include second belt members and said second elastic members comprise elastic cushion materials arranged along said second belt members.

2. The child-care instrument according to claim 1, wherein said crotch belt includes an upright part and a pair of side extension parts extending from two sides of an upper end of said upright part, and said waist belts extend on said side extension parts in said closed restraint position.

3. The child-care instrument according to claim 1, wherein said crotch belt, or said waist belts, or said crotch belt and said waist belts, respectively have a curved configuration which curves convexly outward while said crotch belt and said waist belts are held in said closed restraint position when said fixture arrangement is connected.

4. The child-care instrument according to claim 1, wherein said crotch belt includes an upright part and a pair of side extension parts extending from two sides of an upper end of said upright part, and said upper end and said pair of side extension parts have a configuration so as to form a smooth surface that is adapted to wrap around a waist of the child.

5. The child-care instrument according to claim 4, wherein said side extension parts are adapted to be positioned in respective gaps between the waist of the child and said side surfaces of said seat.

6. The child-care instrument according to claims 1, wherein said fixture arrangement includes a receiver tool mounted on an outwardly facing surface of an upper end of said crotch belt, and insertion tools respectively mounted on ends of said waist belts and adapted to be inserted in and connected to said receiver tool.

7. The child-care instrument according to claim 1, wherein said child-care instrument is selected from the group consisting of a baby carriage, a child safety seat, or an infant chair.

8. The child-care instrument according to claim 1, wherein said crotch belt includes said elastic cushion material arranged along said first belt member, and said waist belts respectively include said elastic cushion materials arranged along said second belt members.

9. The child-care instrument according to claim 1, wherein said elastic cushion material is arranged only on an inwardly facing surface of said first belt member of said crotch belt, and/or wherein said waist belts respectively include said second belt members, said second elastic members comprise said elastic cushion materials arranged along said second belt members, said elastic cushion materials are arranged only on respective inwardly facing surfaces of said second belt members of said waist belts.

10. The child-care instrument according to claim 1, wherein said crotch belt further includes a cover member that integrates and covers said first belt member and said elastic cushion material, which extend through said cover member.

11. The child-care instrument according to claim 1, wherein said waist belts respectively include said second belt members, said second elastic members comprise said elastic cushion materials arranged along said second belt members, and said waist belts respectively further include cover members that integrate and cover said second belt members and said elastic cushion materials, which extend through said cover members.

12. The child-care instrument according to claim 1, wherein a base end of said elastic cushion material of said crotch belt is fixed to said seating surface of said seat.

13. The child-care instrument according to claim 1, wherein a base end of said elastic cushion material of said crotch belt is fixed under said seating surface of said seat.

14. A child seating instrument configured and adapted to have a child seated therein, comprising:
   a seat having a seating surface adapted to support the child thereon, and two side supports extending upwardly from said seating surface at two sides of said seating surface; and
   a body restraint arrangement connected to said seat and adapted to restrain the child in said seat;
   wherein:
   said body restraint arrangement comprises a crotch belt extending upward from said seating surface at a position between said two sides of said seating surface, two waist belts extending upward respectively at said two sides of said seating surface inwardly from said side supports, and a fixture arrangement attached to and adapted to selectively interconnect said crotch belt and said waist belts so as to restrain the child in said seat;
   said crotch belt comprises a first flexible belt member having a bottom fixed end thereof fixed to said seat and having a top free end thereof attached to a first part of said fixture arrangement, and a first elastic cushion material arranged along an inwardly facing surface of said first flexible belt member, wherein said first elastic cushion material is arranged and adapted to exert an elastic force along said first flexible belt member that urges said crotch belt forwardly;
   said waist belts respectively comprise second and third flexible belt members having bottom fixed ends thereof fixed to said seat and having top free ends thereof attached respectively to second and third parts of said fixture arrangement, and second and third elastic members arranged and adapted to exert elastic forces that urge said waist belts respectively laterally outwardly;
   said fixture arrangement is adapted to hold said crotch belt and said waist belts deflected toward the child against the urging of said elastic forces in a closed restraint position so as to restrain the child when said first, second and third parts of said fixture arrangement are interconnected so as to interconnect said crotch belt and said waist belts; and
   said crotch belt and said waist belts are adapted to be respectively urged to an open position thereof by said elastic forces when said first, second and third parts of said fixture arrangement are disconnected so as to disconnect said crotch belt and said waist belts, so that said crotch belt in said open position extends forwardly in front of said position at which said crotch belt extends upwardly from said seating surface, and said waist belts in said open position extend upwardly along and laterally inwardly from said side supports of said seat.

15. The child seating instrument according to claim 14, wherein said first elastic cushion material is arranged only on and along said inwardly facing surface of said first flexible belt member.

16. The child seating instrument according to claim 14, wherein said crotch belt further includes a cover member that integrates and covers said first flexible belt member and said first elastic cushion material, which extend through said cover member.

17. The child seating instrument according to claim 14, wherein a base end of said first elastic cushion material is fixed to said seat either to or under said seating surface.

* * * * *